(12) United States Patent
Suzuki et al.

(10) Patent No.: US 8,051,278 B2
(45) Date of Patent: Nov. 1, 2011

(54) MICROCOMPUTER AND METHOD OF SETTING OPERATION OF MICROCOMPUTER

(75) Inventors: Hitoshi Suzuki, Kanagawa (JP); Masayuki Daito, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 616 days.

(21) Appl. No.: 12/078,621

(22) Filed: Apr. 2, 2008

(65) Prior Publication Data

US 2008/0250235 A1 Oct. 9, 2008

(30) Foreign Application Priority Data

Apr. 4, 2007 (JP) ................. 2007-098015

(51) Int. Cl.
*G06F 9/00* (2006.01)
*G06F 9/44* (2006.01)
(52) U.S. Cl. ......... 712/244; 711/202; 711/103; 713/100
(58) Field of Classification Search .................. 712/244; 711/202, 103; 713/100
See application file for complete search history.

(56) References Cited

U.S. PATENT DOCUMENTS

| 5,027,273 A | * | 6/1991 | Letwin ........................... 713/600 |
| 6,079,015 A | | 6/2000 | Harwood, III et al. |
| 2005/0268069 A1 | * | 12/2005 | Fujita et al. ................... 711/202 |

FOREIGN PATENT DOCUMENTS

| JP | 2000-267864 | 9/2000 |
| JP | 2006-268282 | 10/2006 |

* cited by examiner

*Primary Examiner* — Alford W. Kindred
*Assistant Examiner* — Jesse R Moll
(74) *Attorney, Agent, or Firm* — McGinn IP Law Group, PLLC (57) ABSTRACT

Provided is a microcomputer having the improved flexibility in changing correspondences between exception causes and exception vectors. The microcomputer includes: a vector candidate output section capable of outputting a plurality of vector candidates; an address selecting section selecting, as an exception vector, one of the vector candidates according to an exception cause; an instruction execution section starting an exception processing routine by accessing a memory area specified by the exception vector; and a correspondence changing section changing the number of exception causes associated with at least one of address candidates included in the vector candidates.

13 Claims, 12 Drawing Sheets

MICROCOMPUTER AND METHOD OF SETTING OPERATION OF MICROCOMPUTER

BACKGROUND OF THE INVENTION

1. Field of the Invention

The present invention relates to a microcomputer configured to switch between programs in response to an occurrence of an interrupt or exception.

2. Description of Related Art

A microcomputer is designed to stop the execution of a running program and to branch to another program for executing interrupt or exception processing, in response to an occurrence of an interrupt or exception.

In this specification, "an exception" is a general term indicating exceptions in a narrow sense such as: a hardware interrupt requested by peripheral hardware incorporated in the microcomputer or in an external device connected to the microcomputer; a software interrupt caused by a system call instruction or a trap instruction written in an application program; a division by zero caused during the execution of a program; and a suspension of the processing of a running program due to an occurrence of an abnormality such as an overflow or address error.

In this specification, a term of "an exception handler" denotes a program that has an exception processing routine written therein, and be executed in the occurrence of an exception while suspending a program running before the occurrence. Moreover, a term of "an exception handler address" indicates a start address of the exception handler.

In this specification, a term of "an exception vector" denotes information indicating a location to which the processing should branch when an exception occurs. A start address (an exception handler address) of an exception handler is used as an exception vector in some cases. In other cases, a start address in a branch instruction to branch to an exception handler is used instead of a direct exception vector, and thus the exception handler itself is located at an address to which a jump is made according to the branch instruction.

In this specification, a term of "an exception handler address table" denotes a table in which exception handler addresses are arranged, or a table in which branch instructions to jump to exception handler addresses are arranged. An exception vector is used to specify each of array elements, i.e., exception handler addresses or branch instructions to jump to exception handler addresses, in the exception handler address table.

Incidentally, there are other cases where a table formed of an array of exception handler addresses is called "an exception table" or "a vector table," and where a table formed of an array of branch instructions to jump to the respective exception handlers is called "a jump table." In this specification, however, the two tables are collectively called "the exception handler address table."

Furthermore, in this specification, a term of "an exception vector corresponding address" indicates the content of an exception vector. In other words, the exception vector corresponding address is an address specifying an array element in the exception handler address table.

As described above, as the exception handler address table to be referenced to at a start time of exception processing, some of conventional microcomputers use a table directly formed of an array of exception handler addresses, and other some use a table formed of an array of branch instructions to jump to the respective exception handlers.

For example, U.S. Pat. No. 6,079,015 discloses a technique of relocating memory maps between a first memory map (exception table) and a second memory map (jump table). More precisely, the first memory map directly stores exception handlers ("exception routines" in U.S. Pat. No. 6,079,015) in memory areas each predetermined corresponding to an exception cause. In contrast, the second memory map stores branch instructions to jump to the respective exception handlers (exception routines) in memory areas each predetermined corresponding to an exception cause. Here, the memory area used by the second memory map is smaller than that of the first memory map.

There is a demand for changing the size of the exception handler address table according to an operation mode of the microcomputer. This demand is particularly strong for a built-in type microcomputer for a system under severe constraints on an available memory size. For example, at a time of starting the microcomputer, a time of rewriting a flash ROM included in the microcomputer, or another time, a limitation is imposed on the available memory size while only limited kinds of exceptions (exception causes) may occur. Accordingly, when the microcomputer operates in a reduced operation mode such as an operation mode for the start-up processing or an operation mode for maintenance work like the flash ROM rewriting processing, it is desirable to reduce the exception handler address table by decreasing the number of exception vectors from that used by the microcomputer in a normal operation mode.

Japanese Patent Application Publication No. 2000-267864 discloses a technique of enhancing efficiency of memory use by reducing a memory area used as the exception handler address table ("an interrupt vector table" in JP-A No. 2000-267864) as a result of releasing a part of the memory area that is out of use as the exception handler address table. The technique disclosed in JP-A No. 2000-267864, however, is based on an idea that there is no need to prepare exception vectors ("interrupt vectors" in JP-A No. 2000-267864) corresponding to out-of-use exception causes ("interrupt factors" in JP-A No. 2000-267864), that is, an idea that there is no need to hold exception handler addresses ("interrupt program start address" in JP-A No. 2000-267864) corresponding to out-of-use exception causes. Based on this idea, the exception handler address table is reduced in size without holding the exception handler addresses corresponding to the out-of-use exception causes. In other words, the technique disclosed in JP-A No. 2000-267864 allows the size of the exception handler address table to be reduced, but does not make a change in correspondences between exception causes and exception vector on a one-to-one basis.

Even though possible exception causes are limited in the foregoing example such as a case of starting the microcomputer, or rewriting the flash ROM, the microcomputer needs to deal with an unanticipated contingency that an instruction to request unexpected exception processing is inputted. To this end, the microcomputer in the reduced operation mode must be ready to provide at least some of exception handlers corresponding to exception causes generally considered to occur only in the normal operation mode. Thus, the technique disclosed in JP-A No. 2000-267864 has a limitation on the number of reducible exception vectors. That is to say, the conventional microcomputer lacks the flexibility in changing correspondences between exception causes and exception vectors, and thereby is incapable of reducing the exception handler address table sufficiently when such reduction is required.

SUMMARY

The present invention seeks to solve one or more of the above problems, or to improve upon those problems at least in part.

In one embodiment, a microcomputer includes an address candidate output section capable of outputting a plurality of address candidates, an address selecting section that selects, as an output address, one of the plurality of address candidates according to one of a plurality of exception causes, an instruction execution section that starts an exception processing routine by accessing a memory area specified by the output address, and a correspondence changing section that changes the number of exception causes associated with at least one of the plurality of address candidates. This configuration enables the microcomputer to decrease the number of exception vectors while increasing the number of exception causes associated with the used exception vectors when the operation mode of the microcomputer is switched. In other words, since the microcomputer is capable of decreasing the number of exception vectors without decreasing the number of acceptable exception causes, the size of exception handler address table can be reduced sufficiently. In this way, the present invention achieves an improvement of the flexibility in changing correspondences between exception causes and exception vectors.

In another embodiment, a method of setting an operation of a microcomputer is implemented by use of an exception handler address table and an address selecting section. In the exception handler address table, a plurality of branch instructions is arranged. Each of the branch instructions is an instruction to branch to the start address of a corresponding one of a plurality of exception processing routines. The address selecting section is configured to output, as an exception vector corresponding address specifying one of the plurality of branch instructions, one of a plurality of address candidates selected according to an inputted exception cause. The method includes arranging the exception handler address table in a memory accessible from the microcomputer, changing the number of exception causes associated with at least one of the plurality of address candidates.

This allows the microcomputer to decrease the number of exception vectors without decreasing the number of acceptable exception causes, and thereby leads to a sufficient reduction in the size of exception handler address table. In this way, the present invention achieves an improvement of the flexibility in changing correspondences between exception causes and exception vectors.

According to the present invention, provided is a microcomputer having the improved flexibility in changing correspondences between exception causes and exception vectors.

BRIEF DESCRIPTION OF THE DRAWINGS

The above and other objects, advantages and features of the present invention will be more apparent from the following of certain preferred embodiments taken in conjunction with the accompanying drawings, in which.

DETAILED DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Embodiment 1 of the Invention

Figure 1:
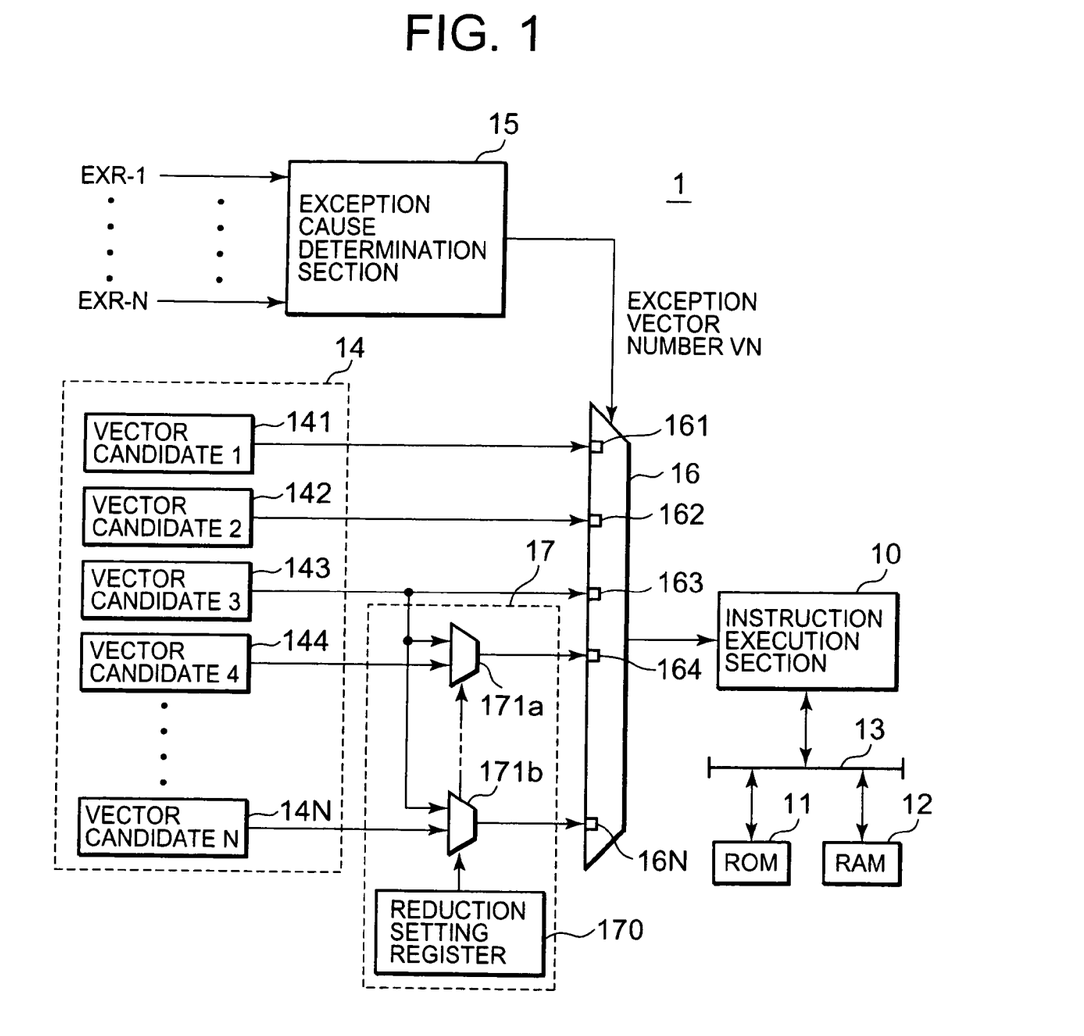
FIG. 1 is a configuration diagram of a microcomputer according to Embodiment 1 of the present invention.

FIG. 1 shows a configuration of a microcomputer 1 according to this embodiment. The microcomputer 1 is a microcomputer using an exception handler address table including an array of branch instructions to jump to exception handler addresses. The exception handler address table is arranged in a memory area in either a ROM 11 or a RAM 12.

In FIG. 1, an instruction execution section 10 reads an instruction from the ROM 11 or the RAM 12, decodes the read instruction, and executes processing according to the instruction. Examples of the processing thus executed include computation processing for arithmetic operations, logical operations or the like, and read access or write access to the ROM 11 or the RAM 12.

The ROM 11 and the RAM 12 are connected to the instruction execution section 10 through a memory bus 13. The ROM 11 and the RAM 12 are each used as a storage area for a program read and executed by the instruction execution section 10, and a storage area for data used by the program or data on computation result obtained by the program. Moreover, a part of the ROM 11 or the RAM 12 is used as the exception handler address table in which a group of branch instructions to jump to the start addresses (exception handler addresses) of the actual exception handlers are arranged.

The vector candidate output section 14 is a circuit that outputs vector candidates 1 to N. Here, the vector candidates 1 to N are candidate values one of which is selected for an exception vector corresponding address (that is, an address specifying a storage location of a branch instruction that is an array element in the exception handler address table in the case of this embodiment) according to an exception cause. The vector candidates 1 to N are stored in address storage sections 141 to 14N, respectively. Incidentally, in practice, the address storage sections 141 to 14N may be configured of a semiconductor memory such as an EEPROM or a combinational circuit and the like. The address storage sections 141 to 14N may be configured of one base address register for storing the base address of an exception vector; and N offset registers for respectively storing offset values that are to be added to the base address.

An exception cause determination section 15 receives exception processing requests EXR-1 to EXR-N, and outputs, to an address selecting section 16, exception vector numbers VN predetermined corresponding to types of exception processing requests (exception causes) to be received.

An address selecting section 16 selects, for the exception vector, one address from the vector candidates 1 to N according to one of the exception vector numbers VN inputted from the exception cause determination section 15, and then supplies the exception vector to the instruction execution section 10. Upon receipt of the exception vector from the address selecting section 16, the instruction execution section 10 accesses the memory area (exception handler address table) specified by the exception vector to fetch the branch instruction, and then starts the exception processing routine by executing the branch instruction.

The address selecting section 16 in this embodiment is configured to select one of N input terminals 161 to 16N corresponding to the exception vector number VN, according to their respective predetermined correspondences between the exception vector numbers VN and the N input terminals 161 to 16N. For example, when the exception vector number VN indicates "1," "2" or "N," the address selecting section 16 selects the input terminal 161, 162 or 16N, respectively.

Here, a detailed description will be given for a connection between the address selecting section 16 and the vector candidate output section 14. The input terminals 161 to 16N of the address selecting section 16 are connected to the address storage sections 141 to 14N either directly or through a correspondence changing section 17, which will be described later. In the configuration example of this embodiment shown in FIG. 1, the address storage sections 141 to 143 storing the exception vector candidates 1 to 3 are connected to the input terminals 161 to 163 on a one-to-one basis. On the other hand, the address storage sections 144 to 14N storing the exception vector candidates 4 to N are connected to the input terminals 164 to 16N through the correspondence changing section 17. The correspondence changing section 17 changes a section connected to each of the input terminals 164 to 16N, between the address storage sections.

The correspondence changing section 17 includes a reduction setting register 170 and N−3 selector circuits. Incidentally, FIG. 1 shows only two selector circuits 171a and 171b included in the N−3 selector circuits. The selector circuit 171a selectively supplies any one of the vector candidates 3 and 4 to the input terminal 164 by switching the connection of the input terminal 164 between the address storage sections 143 and 144. Similarly, the selector circuit 171b selectively supplies any one of the vector candidates 3 and N to the input terminal 16N by switching the connection of the input terminal 16N between the address storage sections 143 and 14N.

A value set in the reduction setting register 170 is used to determine the selection setting of each of the N−3 selector circuits including the selector circuits 171a and 171b. To this end, the reduction setting register 170 may be configured to hold N−3 bit data, and to use one bit of the N−3 bit data to specify the selection state of each of the N−3 selector circuits.

Figure 2A:
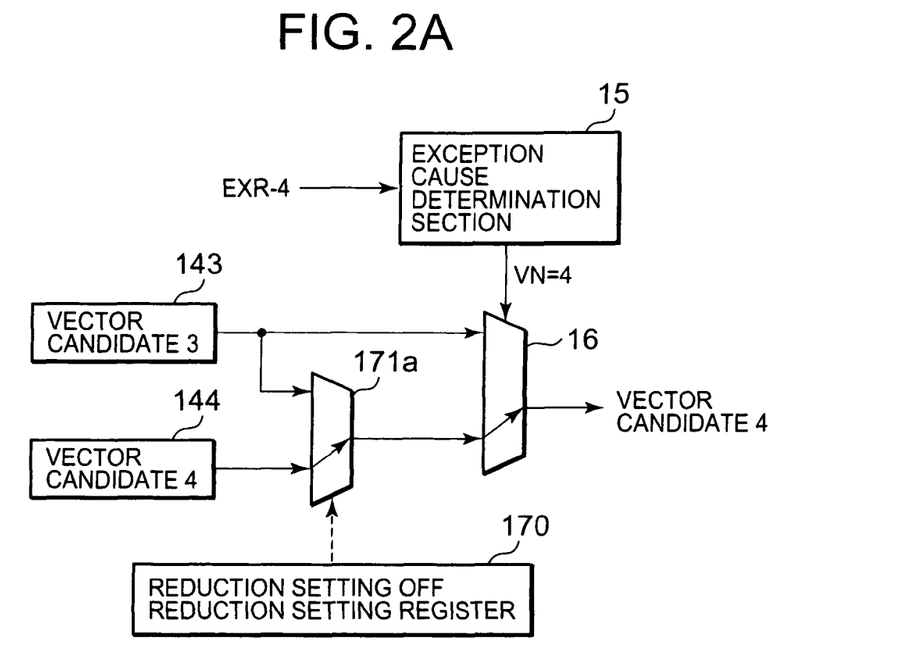
FIGS. 2A and 2B are diagrams for explaining operations of the microcomputer according to Embodiment 1 of the present invention.
Figure 2B:
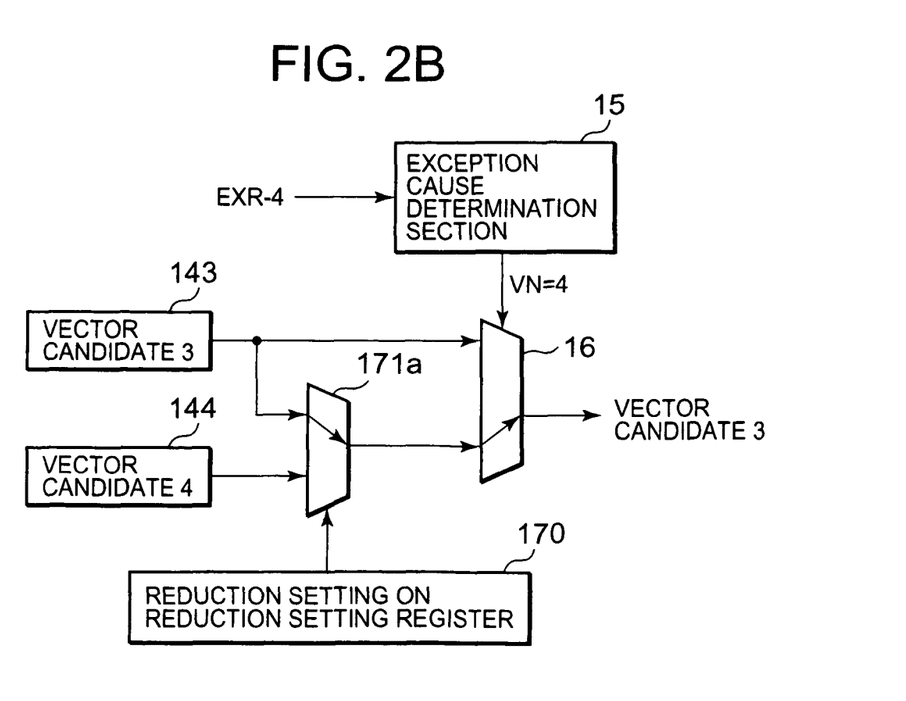

Hereinafter, by use of FIGS. 2A and 2B, descriptions will be provided for an operation of the address selecting section 16 according to the exception vector number VN, and an operation of the selector circuit 171a according to the value set in the reduction setting register 170. FIGS. 2A and 2B each show the exception vector corresponding address outputted by the address selecting section 16 when the exception vector number VN outputted by the exception cause determination section 15 is "4." FIG. 2A shows that the reduction setting register 170 is set to cause the selector circuit 171a to select the address storage section 144. In this case, the vector candidate 4 is selected as the exception vector corresponding address outputted by the address selecting section 16. Note that the setting for causing the selector circuit 171a to select the address storage section 144 is a setting using a larger number of exception vector candidates than the setting shown in FIG. 2B. Accordingly, the setting status of the reduction setting register 170 is shown as "REDUCTION SETTING OFF" in FIG. 2A.

On the other hand, FIG. 2B shows that the reduction setting register 170 is set to cause the selector circuit 171a to select the address storage section 143 (REDUCTION SETTING ON). In this case, even when the exception vector number VN outputted by the exception cause determination section 15 is "4," the vector candidate 3 is selected as the exception vector corresponding address to be outputted by the address selecting section 16. In this way, the microcomputer 1 is capable of selecting the vector candidate 4 as the exception vector corresponding address through the operation that the selector circuit 171a performs according to the reduction setting register 170, in either case where the vector number VN is 3 or 4. In other words, the microcomputer 1 is capable of increasing and decreasing the number of exception causes corresponding to one exception vector candidate. More specifically, in the configuration shown in FIG. 1, the number of exception causes corresponding to the vector candidate 3 can be increased or decreased within a range from 1 to N−2. In addition, this means that the number of exception vector candidates associated with the exception causes is changeable within a range from 3 to N.

Figure 3:
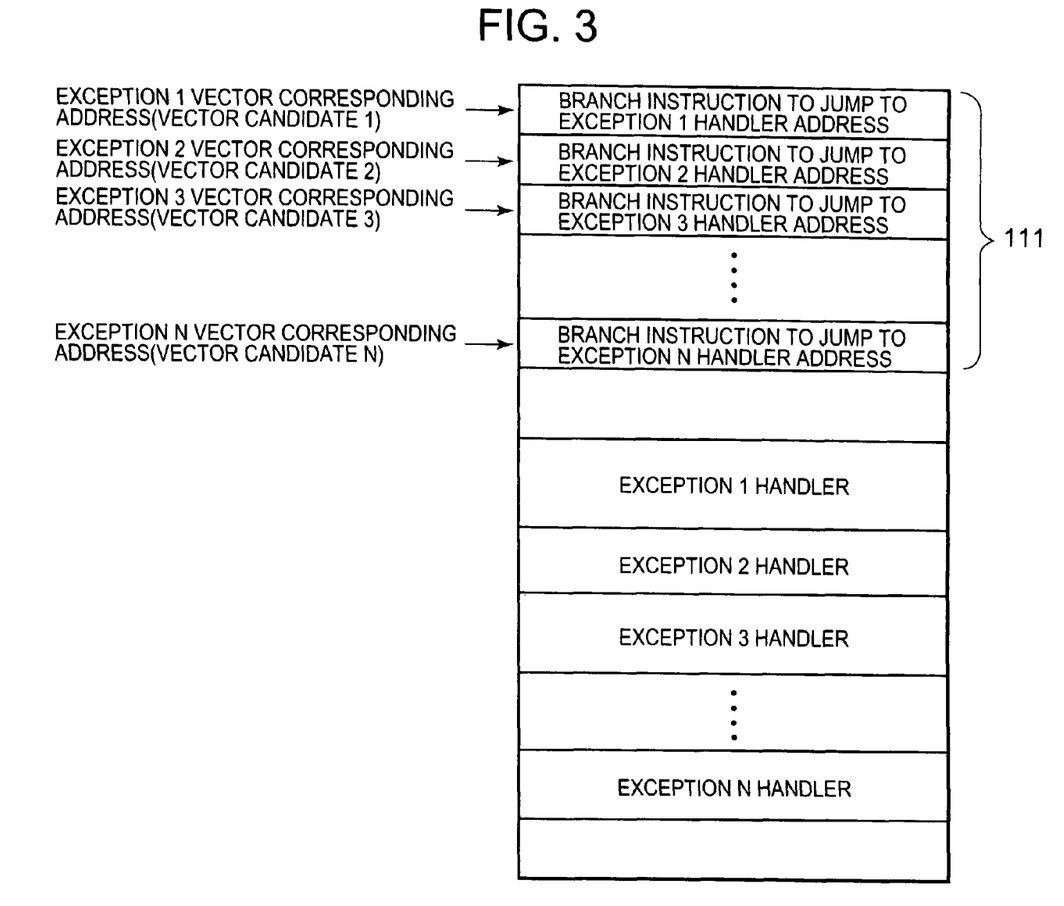
FIG. 3 is a diagram for explaining a change of the size of an exception handler address table by the microcomputer according to Embodiment 1 of the present invention.

A specific example in which the size of the exception vector address table is changed by switching the setting in the reduction setting register 170 will be described by referring to FIGS. 3 and 4. FIG. 3 shows a memory map including the exception handler address table 111 yet to be reduced in size. In other words, FIG. 3 shows the memory map in a case where the reduction setting register 170 has the reduction setting set to OFF. When the reduction setting of the reduction setting register 170 is set to OFF, the address selecting section 16 outputs N exception vector corresponding addresses (vector candidates 1 to N) according to the respective N exception vector numbers. For this purpose, the exception handler address table 111 needs to store N branch instructions.

Figure 4:
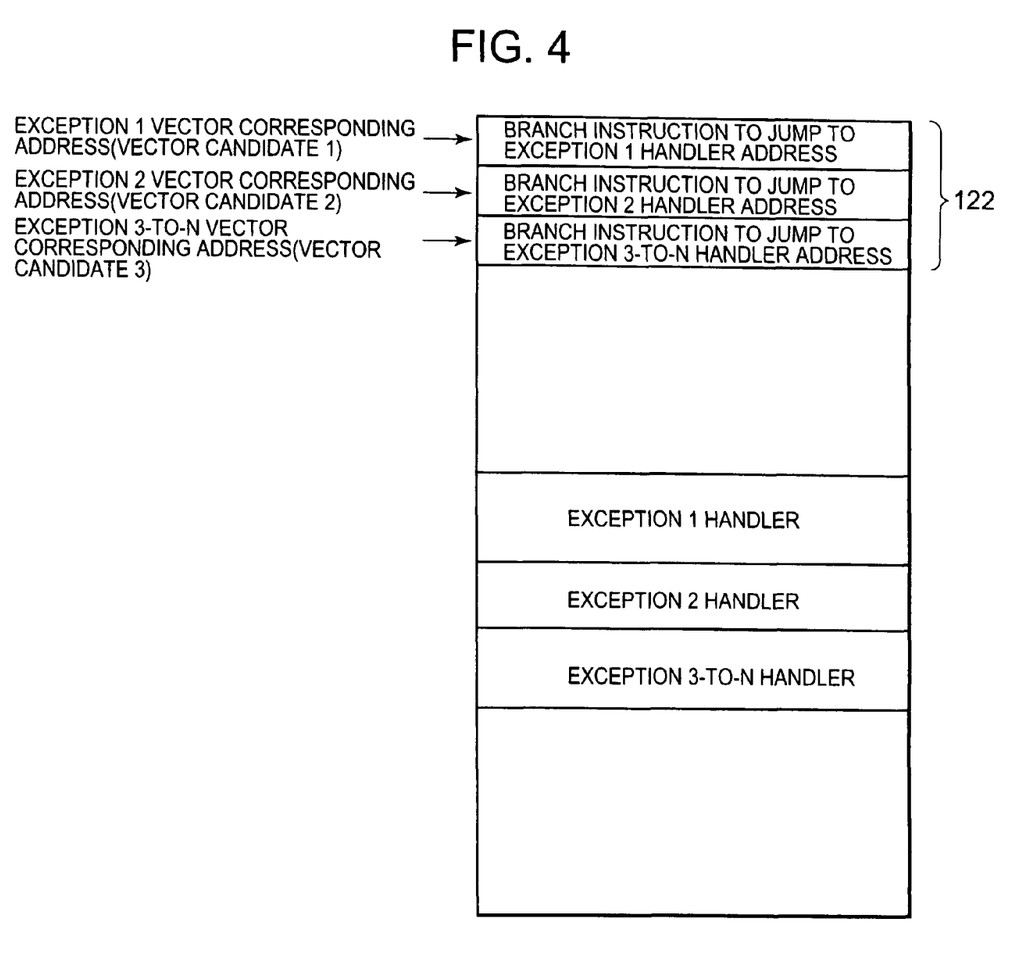
FIG. 4 is a diagram for explaining the change of the size of an exception handler address table by the microcomputer according to Embodiment 1 of the present invention.

On the other hand, FIG. 4 shows a memory map including the exception handler address table 122 reduced in size. In other words, FIG. 4 shows the memory map in a case where the reduction setting register 170 has the reduction setting set to ON. When the reduction setting of the reduction setting register 170 is set to ON, the address selecting section 16 outputs three exception vector corresponding addresses (vector candidates 1 to 3) according to the N exception vector numbers. For this purpose, the exception handler address table 122 needs to store only three branch instructions. Note that, when the reduction setting is set to ON, the exception cause for each of the exception vector numbers 3 to N (exception cause 3 to N) may be identified by reading a value of an exception code held by a cause register (unillustrated). The exception code makes the exception cause identifiable. That is to say, an exception 3-to-N handler identifies which one of the exception causes 3 to N occurs by reading an exception code from the cause register, and thus executes an exception processing routine according to the read exception cause.

As described above, the microcomputer 1 according to this embodiment is capable of changing the number of exception causes associated with at least one vector candidate as well as the number of vector candidates associated with the exception causes by the address selecting section 16 that supplies one of the exception vector corresponding addresses to the instruction execution section 10. With this configuration, the microcomputer 1 is capable of decreasing the number of exception vectors while increasing the number of the exception causes associated with the used exception vectors, when the operation mode of the microcomputer 1 is switched. Thanks to the ability to decrease only the number of exception vectors without decreasing the number of acceptable exception causes, the microcomputer 1 is able to sufficiently reduce the size of the exception handler address table at the time of switching the operation mode.

Figures 5A, 5B:
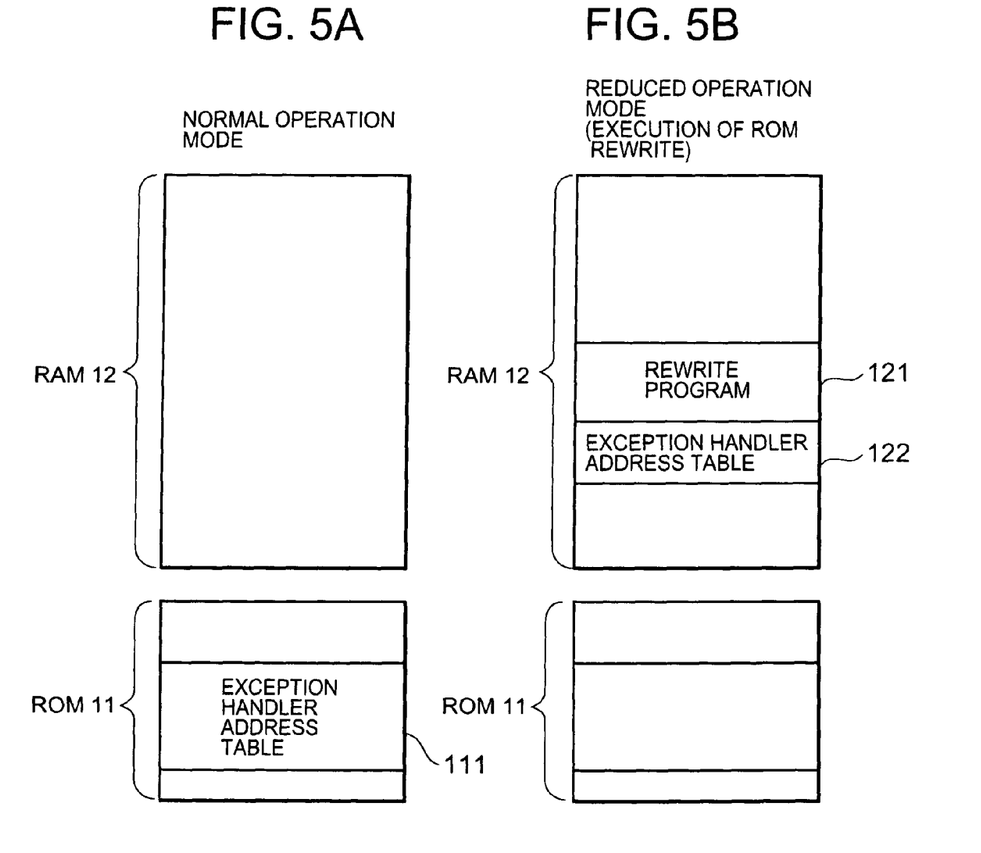
FIGS. 5A and 5B are diagrams for explaining the operations of the microcomputer according to Embodiment 1 of the present invention.

Here, a case of rewriting a flash ROM will be described as an application example of such microcomputer 1. The following description is given by taking as an example a case of rewriting the ROM 11 assuming that the ROM 11 is a rewritable flash ROM. FIG. 5A shows an arranged location of the exception handler address table 111 (an area including an array of branch instructions to jump to the respective actual exception handlers) in a normal operation mode. Here, the normal operation mode is the one in which the instruction execution section 10 executes a system program and application program stored in the ROM 11 and the RAM 12. The normal operation mode is subjected to fewer constraints on the use amounts of ROM 11 and the RAM 12 than a reduced operation mode, which will be described later, and is required to achieve high-speed performance for the execution of an exception processing routine. For this reason, in the normal operation mode, the reduction setting register 170 is set to have "the reduction setting OFF."

On the other hand, FIG. 5B shows an arranged location of the exception handler address table 122 in the reduced operation mode in which the microcomputer 1 rewrites the ROM 11. In the reduced operation mode for rewriting the ROM 11, the ROM 11 is rewritten by executing a rewrite program 121 arranged in the RAM 12. At this time, the actual exception handler address table 111 arranged in the ROM 11 is not available. Accordingly, a temporal exception handler address table 122 is arranged in the RAM 12 in order to respond an exception processing request that may be issued during the rewrite of the ROM 11. The microcomputer 1 according to this embodiment is able to decrease the number of exception vectors is decreased by setting the reduction setting register 170 to have "the reduction setting ON," and thus to reduce the size of the temporal exception handler address table 122 arranged in the RAM 12.

As described above, FIG. 1 shows the configuration using as the exception vectors the N vector candidates under the reduction setting of OFF, while using as the exception vectors the 3 to (N−1) vector candidates under the reduction setting of ON. However, such a configuration is only an example as a matter of course. More specifically, by changing the number of selector circuits provided on wirings between the address storage sections 141 to 14N and the address selecting section 16, the microcomputer 1 is switchable between a state using N vector candidates as the exception vectors and a state using certain M (where M<N) of vector candidates as the exception vectors.

Figure 6:
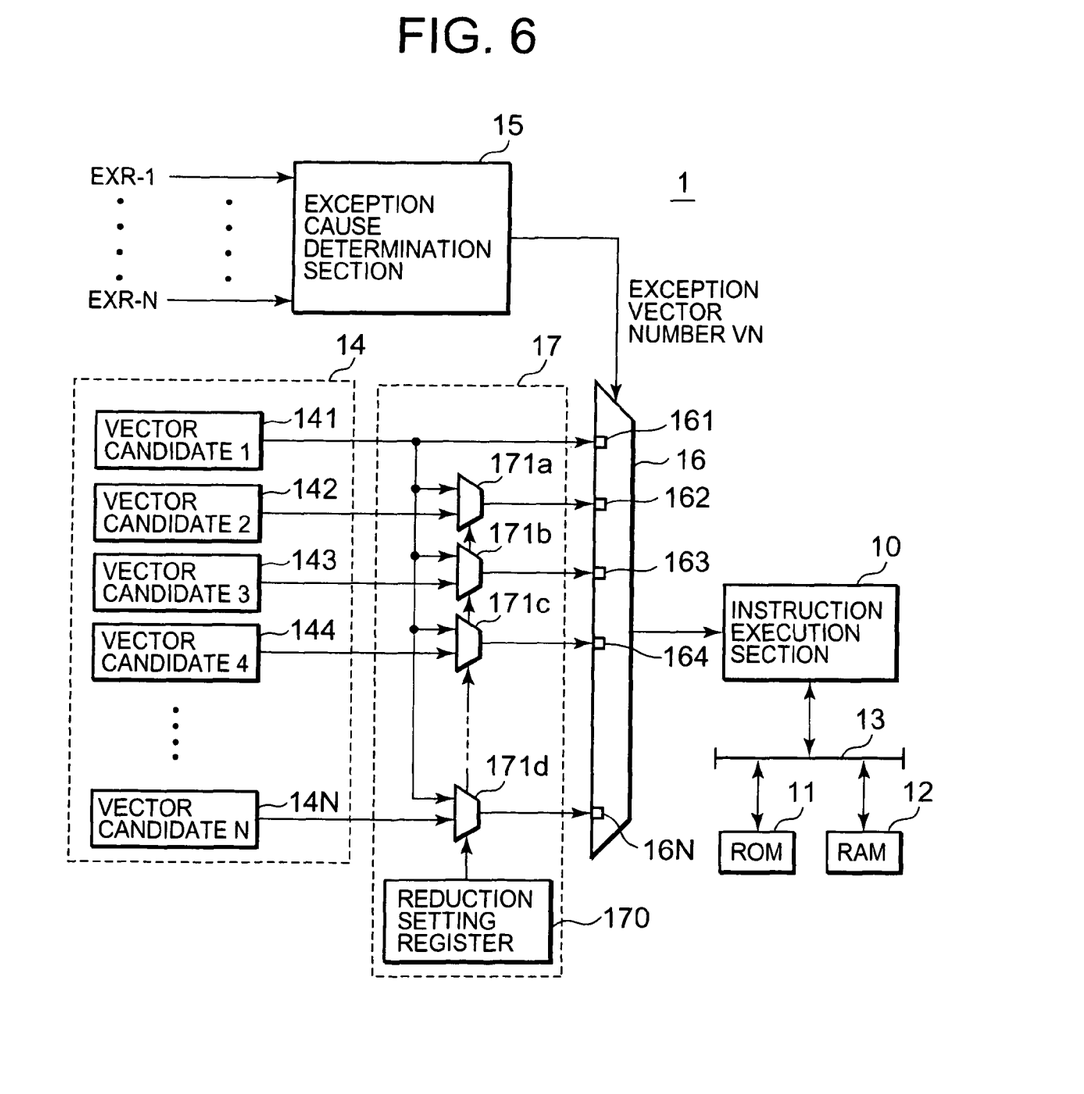
FIG. 6 shows a modified example of the microcomputer according to Embodiment 1 of the present invention.
Figure 7:
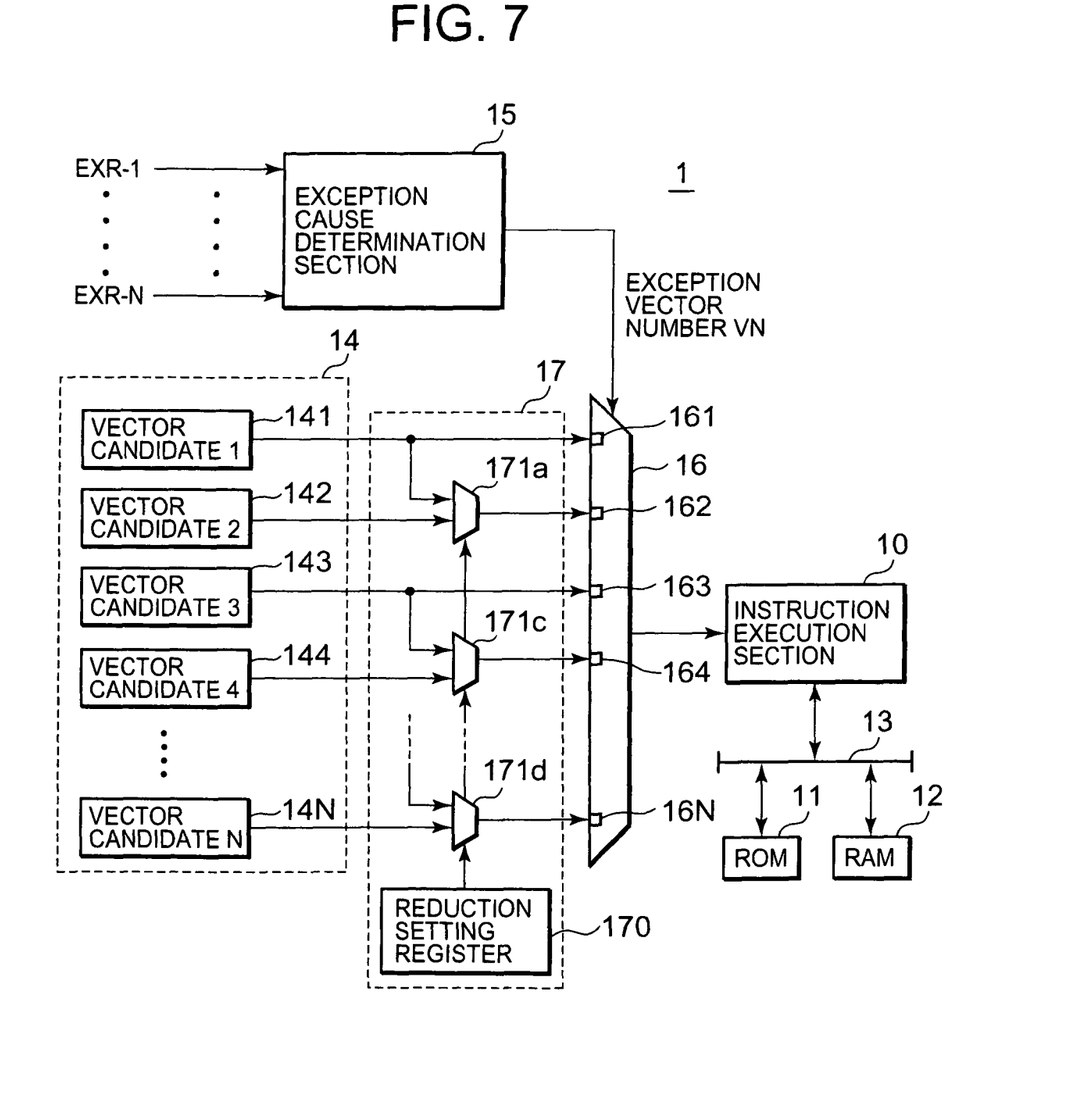
FIG. 7 shows a modified example of the microcomputer according to Embodiment 1 of the present invention.

FIGS. 6 and 7 show modified examples of the configuration shown in FIG. 1. In the configuration shown in FIG. 6, a selector circuit is provided between each of N−1 address storage sections 142 to 14N and an address selecting section 16. Accordingly, a microcomputer 1 having the configuration in FIG. 6 is switchable between a state using N vector candidates 1 to N as the exception vectors and a state using N−1 vector candidates as the exception vectors.

In the configuration in FIG. 7, a selector circuit is provided between an address selecting section 16 and each of address storage sections storing even-numbered vector candidates 2, 4 and so on. A microcomputer 1 having the configuration in FIG. 7 is switchable between a state using N vector candidates 1 to N as the exception vectors and a state using N/2 to (N−1) vector candidates as the exception vectors.

Embodiment 2 of the Invention

Figure 8:
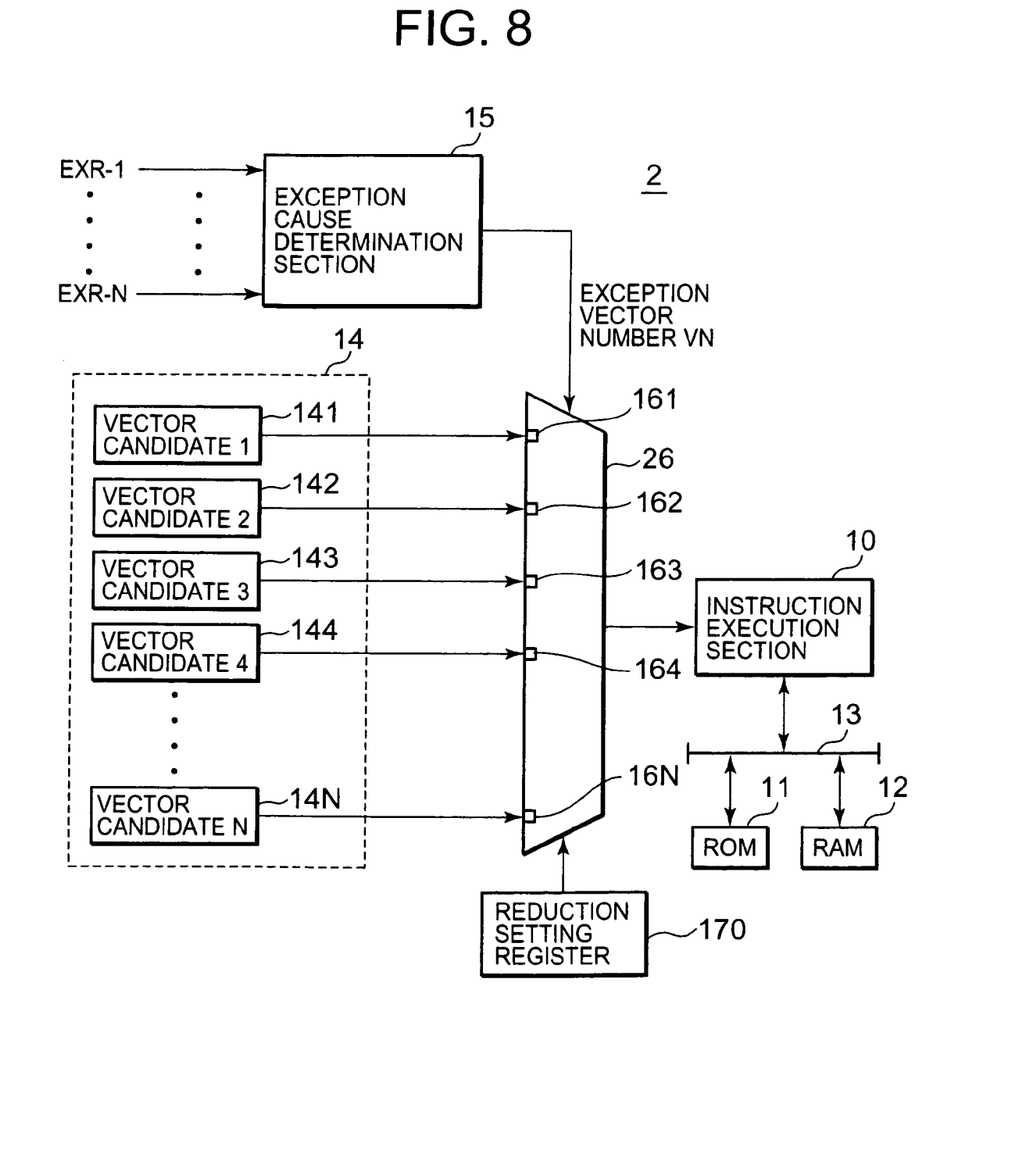
FIG. 8 is a configuration diagram of a microcomputer according to Embodiment 2 of the present invention.

FIG. 8 shows a configuration of a microcomputer 2 according to Embodiment 2. The microcomputer 1 according to foregoing Embodiment 1 of the present invention is capable of changing the number of exception vectors associated with the exception causes through the operations of the selector circuits 171a and 171b provided on the wirings between the vector candidate output section 14 and the address selecting section 16. Unlike the configuration of Embodiment 1 of the invention, the microcomputer 2 according to Embodiment 2 changes the number of exception vectors associated with the exception causes and the number of exception causes associated with one of the exception vectors, by changing a selection logic determining a selection operation that an address selecting section 26 performs according to an exception vector number VN.

For example, in order to cause the microcomputer 2 to perform the same operation as shown in FIG. 2, the selection logic of the address selecting section 26 may be set such that the address selecting section 26 will select an input terminal 164, upon receipt of the exception vector number VN=4, under the condition in which a reduction setting register 170 has a reduction setting set to OFF. In contrast, the selection logic of the address selecting section 26 may be set such that the address selecting section 26 will select an input terminal 163, upon receipt of the exception vector number VN=4, under the condition in which the reduction setting register 170 has the reduction setting set to ON.

In the microcomputer 2 thus configured, the address selecting section 26 for supplying the exception vector to an instruction execution section 10 is capable of decreasing the number of vector candidates while increasing the number of exception causes associated with the used exception vectors when the operation mode of the microcomputer 2 is switched. Accordingly, for example, when the operation mode of the microcomputer 2 is switched, the number of exception vectors can be decreased while the number of exception causes associated with the used exception vectors can be increased. Thus, the microcomputer 2 is capable of decreasing the exception vectors without decreasing the number of exception causes, so that the exception handler address table can be reduced sufficiently.

Embodiment 3 of the Invention

Figure 9:
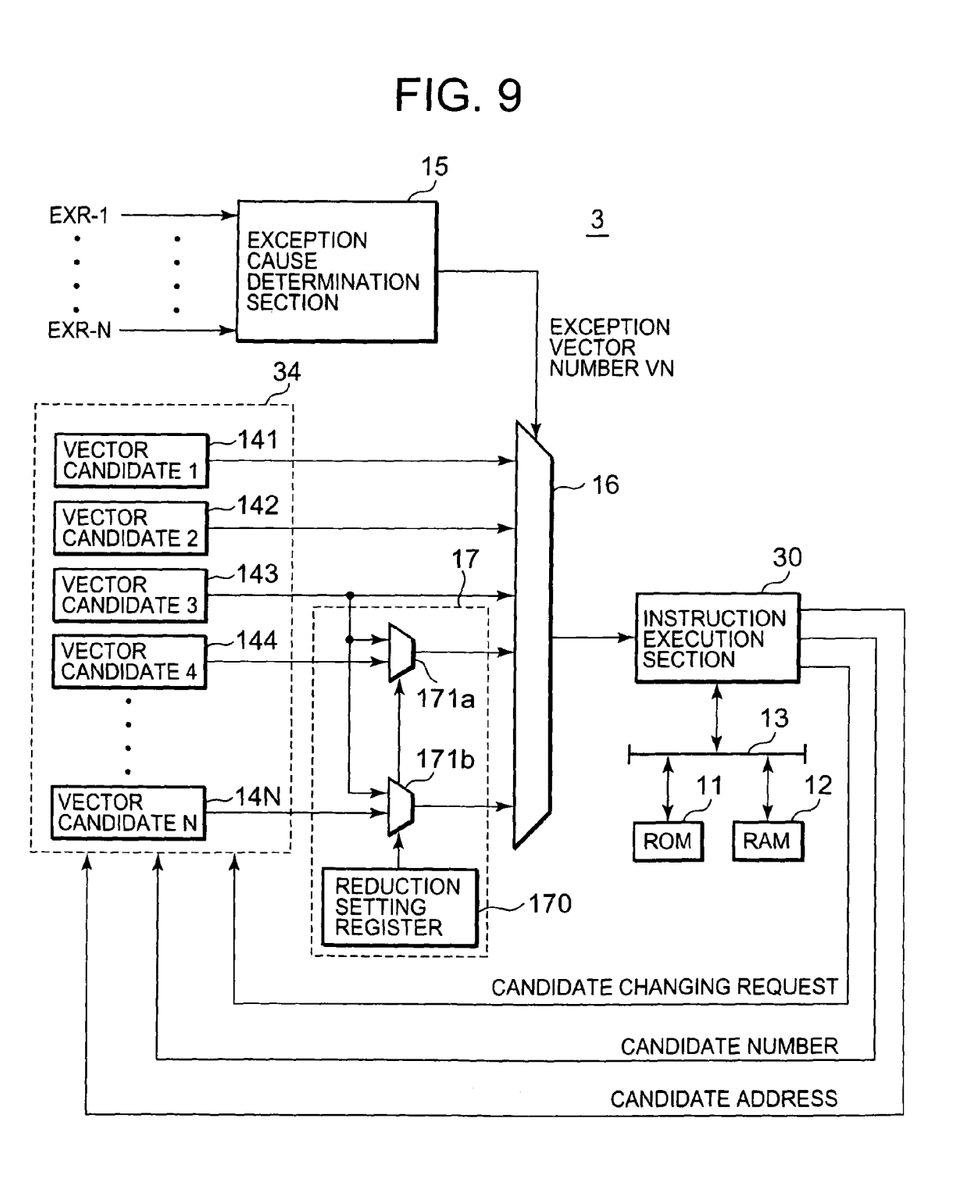
FIG. 9 is a configuration diagram of a microcomputer according to Embodiment 3 of the present invention.

FIG. 9 shows a configuration of a microcomputer 3 according to Embodiment 3. The microcomputer 3 has a configuration similar to that of the microcomputer 1 according to Embodiment 1, and is configured to be able to change the values of the vector candidates 1 to N stored in the address storage sections 141 to 14N.

After an instruction execution section 30 issues a candidate changing request, a vector candidate output section 34 receives a candidate number specifying any one of the vector candidates 1 to N, and a candidate address indicating a value (address) of a vector candidate after the change, and rewrites an address storage section with the candidate address thus received. Here, the rewritten address storage section is one holding the vector candidate specified by the received candidate number. Note that address storage sections 141 to 14N included in the vector candidate output section 34 may be configured of registers. In addition, the address storage sections 141 to 14N may be configured of one base address register for storing a base address of the exception vectors, and an N number of offset registers for storing the offset values that are to be added to the base address.

The microcomputer 3 according to this embodiment is capable of relocating array elements in an exception handler address table by rewriting the vector candidates 1 to N. Moreover, by rewriting one of the vector candidates 1 to N by replacing it with the start address of the exception handler, the microcomputer 3 does not have to include an exception handler address table for holding branch instructions to jump to the respective exception handlers. As a result, the exception handler address table can be further reduced.

Embodiment 4 of the Invention

Figure 10:
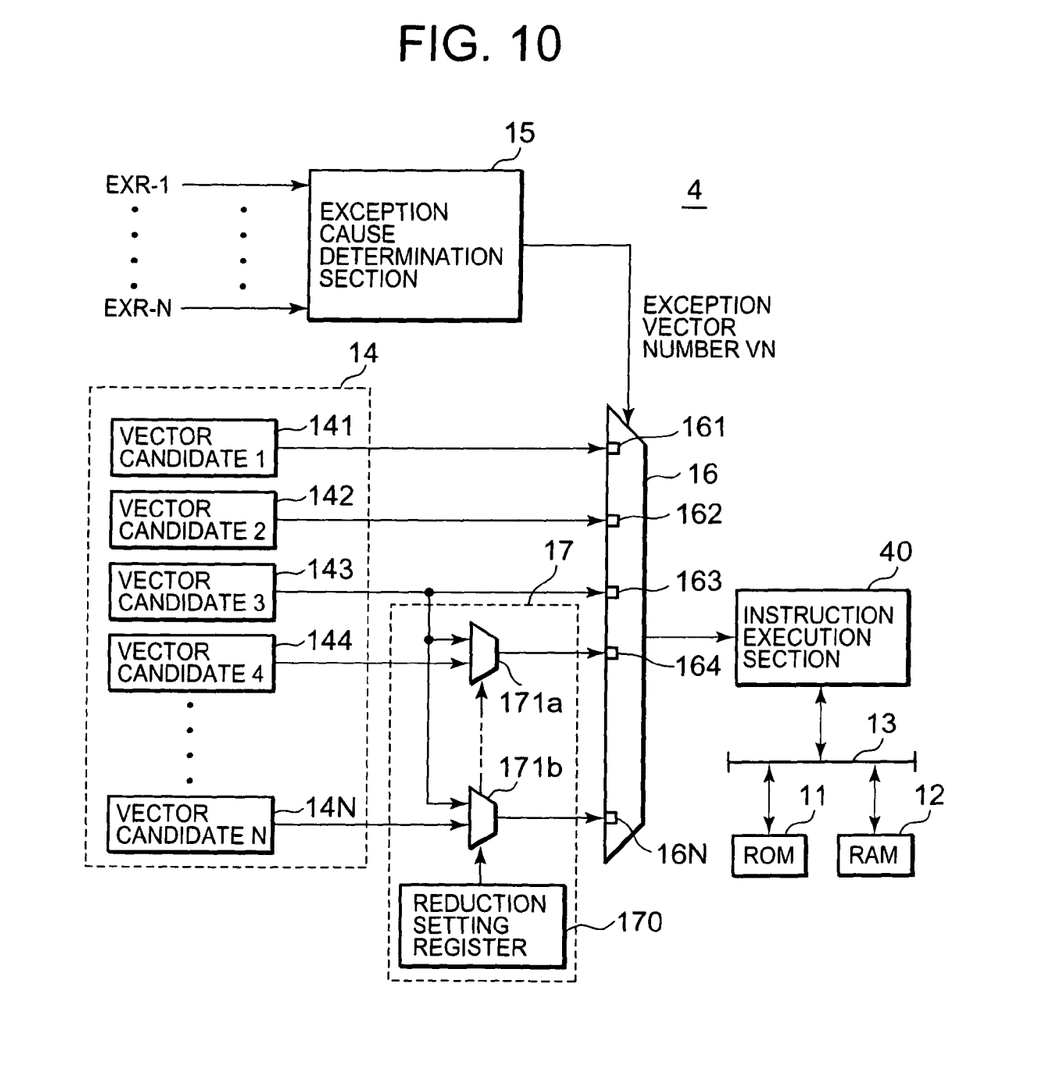
FIG. 10 is a configuration diagram of a microcomputer according to Embodiment 4 of the present invention.

The microcomputer 1 according to foregoing Embodiment 1 of the present invention uses the exception handler address table formed of the array of the branch instructions to jump to the respective exception handler addresses, and the branch instructions to jump to the actual exception handler are held in the memory area in the ROM 11 or the RAM 12 specified by the exception vector. In contrast, a microcomputer 4 according to Embodiment 4 uses an exception handler address table directly formed of an array of exception handler addresses. The exception handler address table is arranged in a memory area in a ROM 11 or a RAM 12 as similar to the microcomputer 1.

In FIG. 10, an instruction execution section 40 reads instructions from the ROM 11 or the RAM 12, decodes the read instruction, and executes processing according to the instruction. Examples of the processing thus executed include computation processing for arithmetic operations, logical operations or the like, and read access or write access to the ROM 11 or the RAM 12. Moreover, the instruction execution section 40 is supplied with an exception vector corresponding address (an address specifying a location storing the exception handler address that is an array element in the exception handler address table in this embodiment) from the address selecting section 16. Thereafter, the instruction execution section 40 obtains the exception handler address by accessing the memory area (in the exception handler address table) specified by the exception vector corresponding address, and then starts the exception processing routine after jumping to the exception handler address thus obtained.

Note that the other components shown in FIG. 10 are the same as those included in the microcomputer 1 according to Embodiment 1 of the invention. For this reason, these components will be provided with the same reference numerals as those in FIG. 1 and will not be described in detail here.

Figure 11:
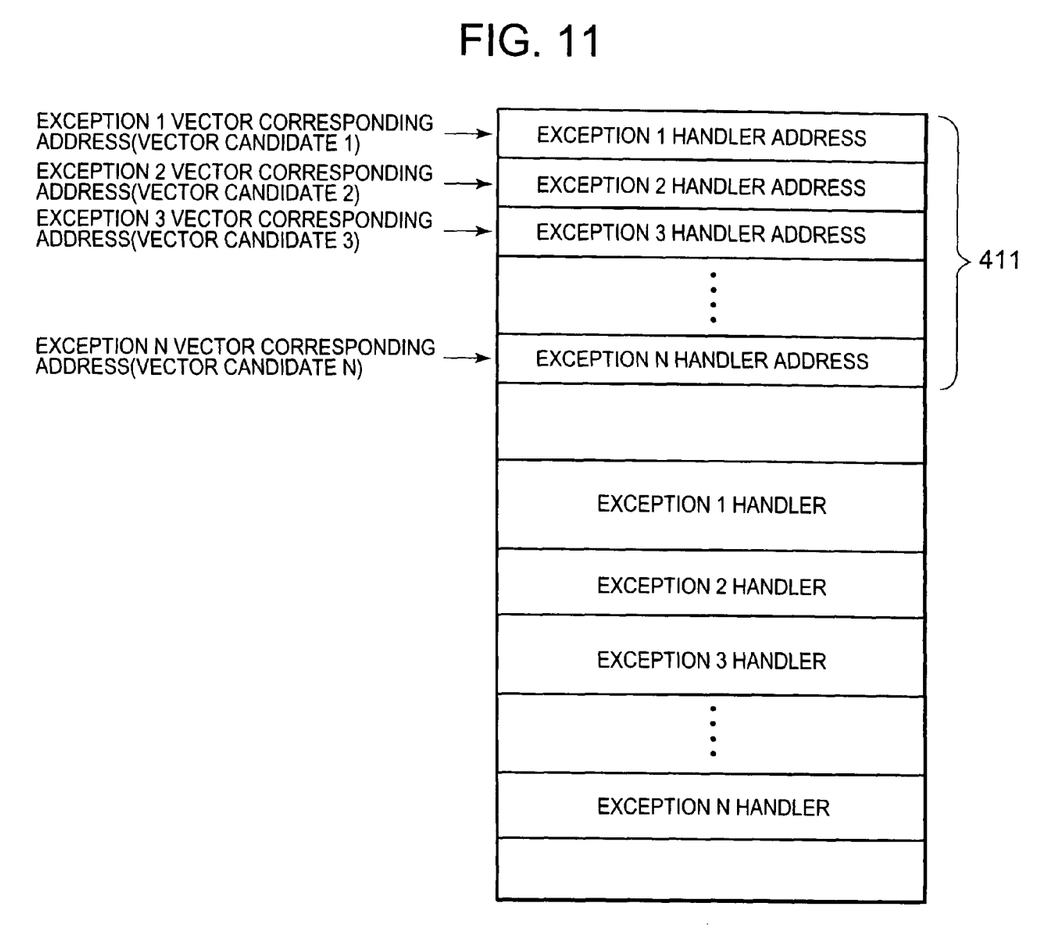
FIG. 11 is a diagram for explaining a change of the size of an exception handler address table by the microcomputer according to Embodiment 4 of the present invention.
Figure 12:
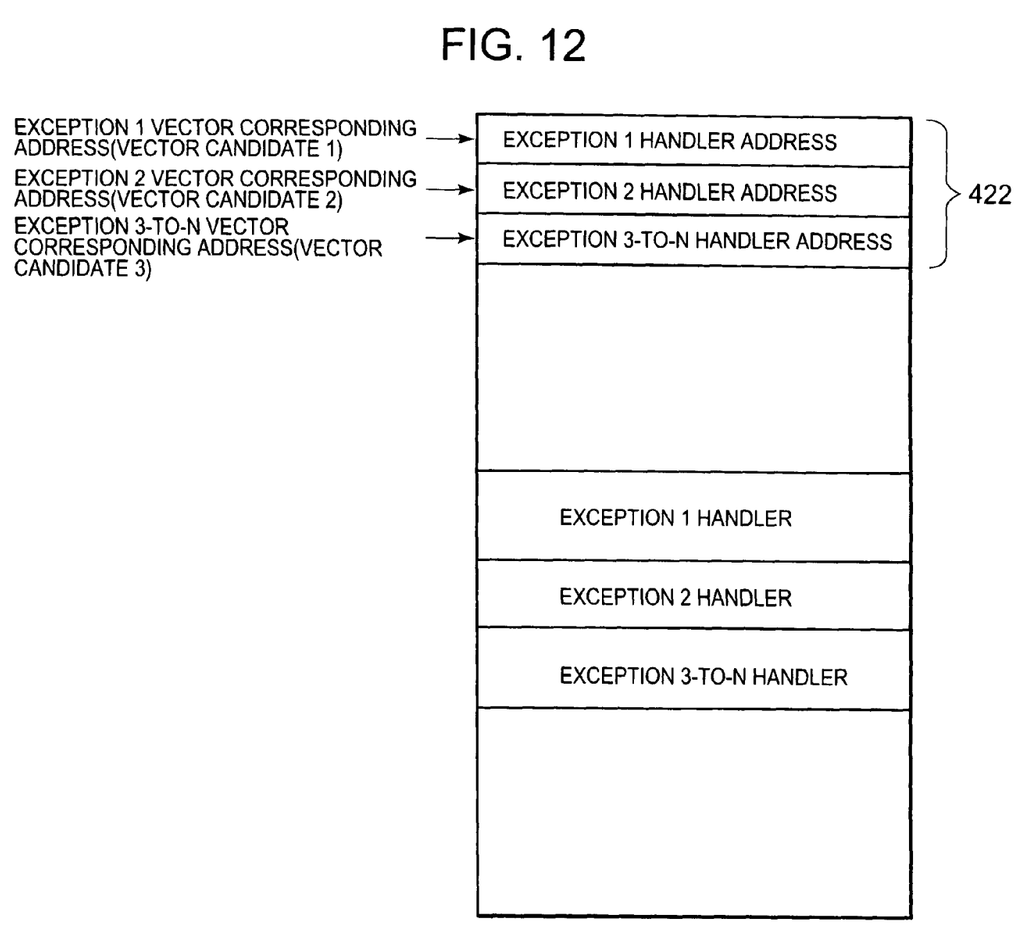
FIG. 12 is a diagram for explaining the change of the size of an exception handler address table by the microcomputer according to Embodiment 4 of the present invention.

By referring to FIGS. 11 and 12, descriptions will be provided for a specific example in which the size of the exception vector address table is changed in the microcomputer 4 by switching settings of a reduction setting register 170. FIG. 11 shows a memory map including an exception handler address table 411 yet to be reduced in size. In other words, FIG. 11 is the memory map in the case where the reduction setting register 170 has the reduction setting set to OFF. When the reduction setting register 170 has the reduction setting set to OFF, the address selecting section 16 outputs N exception vector corresponding addresses (vector candidates 1 to N) in response to N exception vector numbers. For this purpose, the exception handler address table 411 needs to store the N exception handler addresses.

In contrast, FIG. 12 shows a memory map including an exception handler address table 422 reduced in size. In other words, FIG. 12 shows the memory map in the case where the reduction setting register 170 has the reduction setting to ON. When the reduction setting of the reduction setting register 170 is set to ON, the address selecting section 16 outputs three exception vector corresponding addresses (vector candidates 1 to 3) in response to N exception vector numbers. Accordingly, the exception handler address table 422 only needs to store three exception handler addresses.

The microcomputer 4 thus configured is able to change both the number of vector candidates associated with the exception causes by the address selecting section 16 that supplies the exception vector corresponding address to the instruction execution section 40, and the number of exception causes associated with at least one of the vector candidates. On a one-to-one basis, the vector candidates correspond to the exception handler addresses held in the exception handler address table. In other words, the number of vector candidates corresponds to the number of exception handler addresses held in the exception handler address table. Accordingly, for example, when the operation mode of the microcomputer 4 is switched, the number of the exception vectors can be decreased while the number of the exception causes associated with the used exception vector can be increased. In essence, the microcomputer 4 is capable of reducing the exception handler address table in size, since the microcomputer 4 can decrease the number of exception vectors without decreasing the number of acceptable exception causes.

Note that there are no particular restrictions on physical forms to implement the microcomputers 1 to 4 according to foregoing Embodiments 1 to 4. Specifically, the components shown in FIGS. 1, 4 to 8 may be packaged into a single IC chip, or may be divided and packaged into several IC chips.

Moreover, the present invention is not limited to the foregoing embodiments. Obviously, various modifications can be made for the present invention without deviating from the aforementioned sprit of the present invention.

What is claimed is:

1. A microcomputer, comprising:
an exception cause determination section that provides one of a plurality of exception causes;
an address candidate output section capable of outputting a plurality of address candidates, each of the address candidates corresponding to an associated one of the exception causes;
an address selecting section that selects, as an output address, one of the plurality of address candidates according to one of the plurality of exception causes;
an instruction execution section that starts an exception processing routine by accessing a memory area specified by the output address; and
a correspondence changing section that switches between first and second operation modes, each of the address candidates assigned to the associated one of the exception causes in the first operation mode, and at least one of the address candidates assigned to at least two of the exception causes in common in the second operation mode.

2. The microcomputer according to claim 1, wherein the output address comprises an exception vector, and a branch instruction to branch to a start location of a program having the exception processing routine written therein is stored in a memory area specified by the output address.

3. The microcomputer according to claim 1, wherein
the output address comprises an exception vector address indicating a location of the exception vector arranged in an exception vector table, the exception vector indicating a start location of a program having the exception processing routine written therein.

4. The microcomputer according to claim 1, wherein
in response to a switching of an operation mode of the microcomputer, the correspondence changing section changes a number of the exception causes associated with at least one of the plurality of address candidates.

5. The microcomputer according to claim 2, wherein
in response to a switching of an operation mode of the microcomputer, the correspondence changing section changes a number of the exception causes associated with at least one of the plurality of address candidates.

6. The microcomputer according to claim 3, wherein
in response to a switching of an operation mode of the microcomputer, the correspondence changing section changes a number of the exception causes associated with at least one of the plurality of address candidates.

7. The microcomputer according to claim 4, further comprising a rewritable nonvolatile memory, wherein
the switching of the operation mode includes a switching between a normal operation mode in which the instruction execution section executes a program stored in the nonvolatile memory, and a reduced operation mode in which a processing of rewriting the nonvolatile memory is performed.

8. The microcomputer according to claim 1, wherein
the address candidate output section includes a plurality of address storage sections storing the plurality of address candidates on a one-to-one basis, and
the correspondence changing section includes:
    a setting information holding circuit for holding setting information specifying correspondences between the plurality of exception causes and the plurality of address storage sections, and
    a selector circuit provided on a wiring between at least two of the plurality of address storage sections and the address selecting section, the selector circuit selectively supplying the address selecting section with an address candidate held in any one of the at least two address storage sections according to a value held in the setting information holding circuit.

9. The microcomputer according to claim 1, wherein
the correspondence changing section further changes a number of address candidates used in the address selecting section.

10. A method of setting an operation of a microcomputer, said method comprising:
arranging an exception handler address table in a memory accessible from the microcomputer, the exception handler address table formed of an array of a plurality of branch instructions, each of which instructs to branch to a start address of a corresponding one of a plurality of exception processing routines; and
changing a number of exception causes associated with at least one of a plurality of address candidates used in an address selecting section between first and second operation modes, the address selecting section configured to output, as an exception vector corresponding address specifying one of the plurality of branch instructions, one of the plurality of address candidates selected according to an inputted exception cause in the first operation mode or at least one of the address candidates selected according to at least two of inputted exception causes in common in the second operation mode.

11. A microcomputer, comprising:
an exception cause determination section that provides one of a plurality of exception causes;
an address candidate output section capable of outputting a plurality of address candidates;
an address selecting section that selects, as an output address, one of the plurality of address candidates according to one of a plurality of exception causes;
an instruction execution section that starts an exception processing routine by accessing a memory area specified by the output address; and
a correspondence changing section that switches between a first mode and a second mode, each of the address candidates assigned to an associated one of the exception causes in the first operation mode, and at least one of the address candidates assigned to at least two of the exception causes in the second operation mode, according to operation modes of the microcomputer,
wherein the memory area includes a first table and a second table,
    the first table including a plurality of first exception handlers and a plurality of first branch instructions, each of the first exception handlers corresponding to associated one of exception causes, and each of the first branch instructions branching associated one of start address of the first exception handlers;
    the second table including a plurality of second exception handlers and a plurality of second branch instructions, at least one of the second exception handlers corresponding to at least two of exception causes, and each of the second branch instructions branching associated one of start address of the second exception handlers; and
    the correspondence changing section switching the accessible memory area between the first and second tables according to the first and second operation modes of the microcomputer.

12. The microcomputer according to claim 11, wherein the first table is stored in a first memory and the second table is stored in a second memory which is different from the first memory.

13. The microcomputer according to claim 11, wherein the instruction execution section accesses the first table in the first memory in the first mode, and the second table in the second memory in the second mode during a rewriting processing of the first memory.

* * * * *